(12) United States Patent
Shek et al.

(10) Patent No.: US 11,935,006 B2
(45) Date of Patent: Mar. 19, 2024

(54) CENTRALIZED ACCESS CONTROL SYSTEM FOR MULTITENANT SERVICES OF A COLLABORATIVE WORK ENVIRONMENT

(71) Applicants: Atlassian Pty Ltd., Sydney (AU); Atlassian Inc., San Francisco, CA (US)

(72) Inventors: Sidney Shek, Mountain View, CA (US); Ken Adler, San Francisco, CA (US); Laura Edington, Sydney (AU); Sampo Karvonen, Dalas, TX (US); Vladimir Sneblic, Redwood City, CA (US); Omar Sulehria, Denver, CO (US)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 132 days.

(21) Appl. No.: 17/358,477

(22) Filed: Jun. 25, 2021

(65) Prior Publication Data
US 2022/0414601 A1 Dec. 29, 2022

(51) Int. Cl.
*G06Q 10/101* (2023.01)
*G06Q 10/10* (2023.01)
*H04L 9/40* (2022.01)

(52) U.S. Cl.
CPC .......... *G06Q 10/101* (2013.01); *G06Q 10/103* (2013.01); *H04L 63/08* (2013.01); *H04L 63/101* (2013.01); *H04L 63/102* (2013.01)

(58) Field of Classification Search
CPC ..... H04L 63/08; H04L 63/101; H04L 63/102; H04L 63/10; H04L 63/20; H04L 63/0815;
(Continued)

(56) References Cited

U.S. PATENT DOCUMENTS 8,291,490 B1 * 10/2012 Ahmed ................. G06F 21/604
726/20
8,856,289 B2 * 10/2014 Ansari ................. H04L 12/2807
709/220
(Continued)

FOREIGN PATENT DOCUMENTS

CN 100501754 C * 6/2009
CN 113572723 A * 10/2021
(Continued)

OTHER PUBLICATIONS

E. Penna, M. Steffen, L. González and G. Llambías, "Orchestration of secure Web Services within an E-government Interoperability Platform," 2014 XL Latin American Computing Conference (CLEI), Montevideo, Uruguay, 2014, pp. 1-12, doi: 10.1109/CLEI.2014.6965179. (Year: 2014).*
(Continued)

*Primary Examiner* — Andrew L Tank
(74) *Attorney, Agent, or Firm* — Brownstein Hyatt Farber Schreck, LLP

(57) ABSTRACT

A permissions management system and a method for managing permissions in a multiplatform environment. A centralized permissions management system is communicably coupled to a gateway service that receives API calls and requests for content from edge devices, such as user devices. The gateway forwards permissions requests to the centralized permissions management system that determines whether a given user identifier is permitted to access content referenced by a given content identifier. In response, the centralized permissions management system returns an authorization response that, in turn, is forwarded to an identified or determined platform which, in response, can serve content and/or service an API call.

20 Claims, 4 Drawing Sheets

(58) Field of Classification Search
CPC .... G06Q 10/101; G06Q 10/103; G06Q 20/20; G06F 21/45; G06F 21/44; G06F 21/604
See application file for complete search history.

(56) References Cited

U.S. PATENT DOCUMENTS

| | | | | |
|---|---|---|---|---|
| 9,087,189 | B1* | 7/2015 | Koeten | H04L 41/28 |
| 10,397,213 | B2* | 8/2019 | Gilpin | G06F 21/6236 |
| 10,986,131 | B1* | 4/2021 | Kruse | H04L 63/10 |
| 11,063,930 | B1* | 7/2021 | Bose | H04L 63/0428 |
| 2006/0184578 | A1* | 8/2006 | La Rotonda | H04L 67/306 |
| 2011/0107379 | A1* | 5/2011 | Lajoie | H04L 65/612 |
| | | | | 725/151 |
| 2017/0041296 | A1* | 2/2017 | Ford | G06F 21/64 |
| 2017/0155685 | A1* | 6/2017 | Srikanth | G06F 21/45 |
| 2017/0346830 | A1* | 11/2017 | Goldfarb | H04L 67/01 |
| 2018/0041491 | A1* | 2/2018 | Gupta | G06F 9/547 |
| 2019/0205423 | A1* | 7/2019 | Haven | H04L 9/3213 |
| 2020/0186571 | A1* | 6/2020 | Lynk | H04L 63/20 |
| 2021/0211473 | A1* | 7/2021 | Yancey | H04L 63/107 |

FOREIGN PATENT DOCUMENTS

| | | | |
|---|---|---|---|
| CN | 114095213 A | * | 2/2022 |
| WO | WO-2016053749 A1 | * | 4/2016 |

OTHER PUBLICATIONS

"IEEE Standard for the Functional Architecture of Next Generation Service Overlay Networks," in IEEE Std 1903-2011, vol., No., pp. 1-147, Oct. 7, 2011, doi: 10.1109/IEEESTD.2011.6044687. (Year: 2011).*

A. Uszok et al., "KAOS policy management for semantic Web services," in IEEE Intelligent Systems, vol. 19, No. 4, pp. 32-41, Jul.-Aug. 2004, doi: 10.1109/MIS.2004.31. (Year: 2004).*

* cited by examiner

CENTRALIZED ACCESS CONTROL SYSTEM FOR MULTITENANT SERVICES OF A COLLABORATIVE WORK ENVIRONMENT

TECHNICAL FIELD

Embodiments described herein relate to multitenant services of collaborative work environments and, in particular, to systems and methods for managing permissions, policy compliance, and inter-platform integrations between multitenant platforms defining collaborative work environments.

BACKGROUND

An organization can establish a collaborative work environment by securing a tenancy of one or more multitenant cloud collaboration platforms or collaboration services to facilitate, for its employees, cooperation and completion of work related to common goals. For convenience and security (and in some cases, regulatory compliance), such organizations can leverage a single sign-on service for authentication operations across multiple platforms of the organization's collaborative work environment.

Once a user is authenticated, however, organizations typically lean on each individual platform or service to manage authorization operations, such as which properly-authenticated users have permissions to view, edit, and/or delete the organization's content stored by each respective collaboration tool. As a result, databases and permissions management systems of each individual platform or service leveraged by an organization must be regularly and separately monitored, audited, and updated in order to maintain confidence that tenant content is not at risk of unintended disclosure or unauthorized access, which, in turn, may result in disclosure of business intelligence and losses of competitive marketplace advantage(s).

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

DETAILED DESCRIPTION

Figure 1:
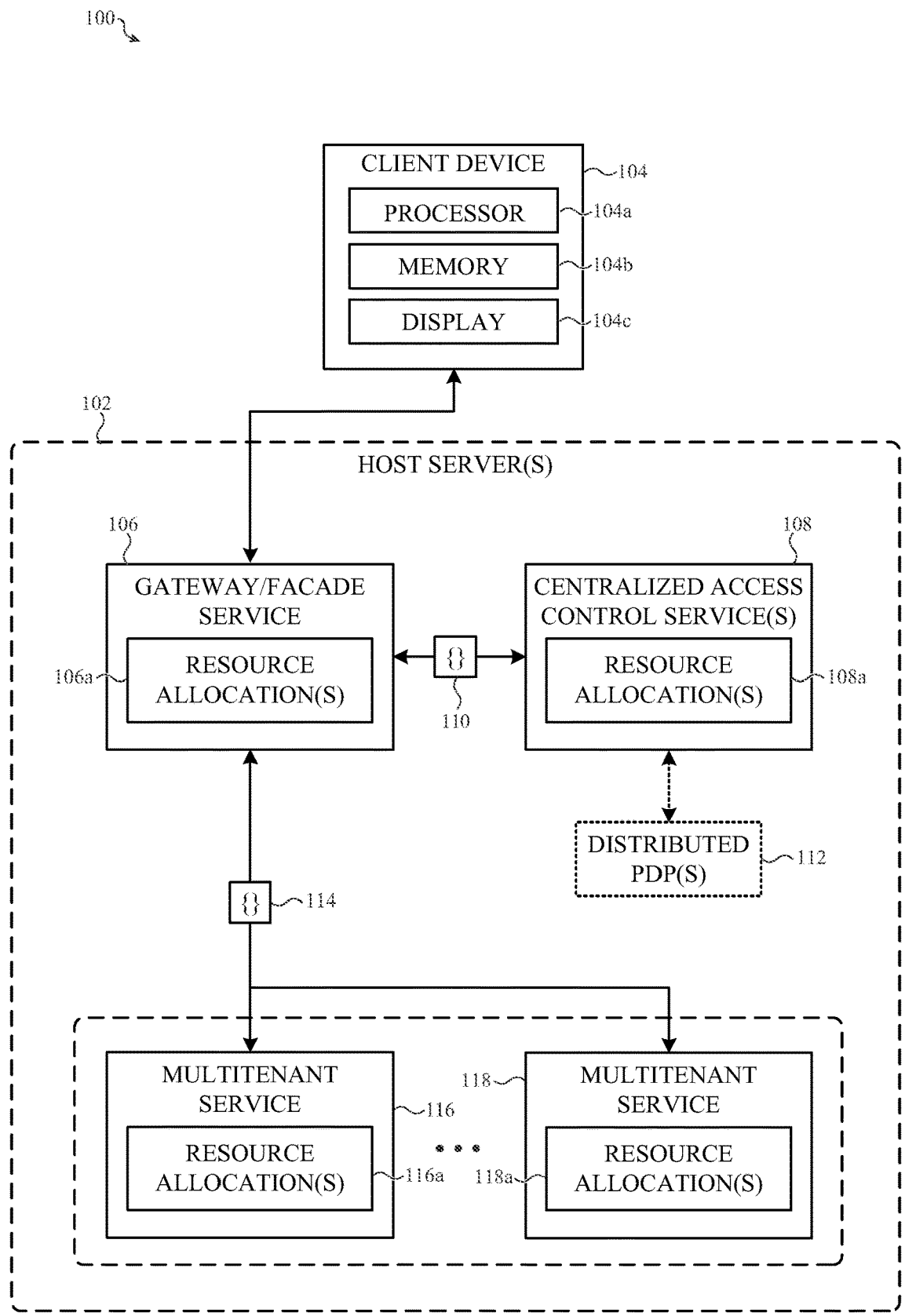
FIG. 1 depicts a simplified system diagram of a collaborative work environment leveraging a centralized access control system or service, such as described herein.

Embodiments described herein relate to systems and methods for centrally controlling access to a single entity's (e.g., a business organization) content that may be created, and later accessed, when leveraging multiple different software platforms, upon each of which the entity owns a tenancy. In another phrasing, embodiments described herein relate to systems and methods for centrally controlling access to content stored within different tenancies of different multitenant software platforms, (herein "software services" or "multitenant software services").

Herein, the phrase "tenant content" may be used to refer to any and all content, data, metadata, or other information regardless of form or format that is authored, developed, created, or otherwise added by, edited by, or otherwise provided for the benefit of, a user of tenant of a multitenant software service. Example tenant content can include personal data, private data, health information, personally-identifying information, business information, trade secret content, copyrighted content or information, restricted access information, research and development information, classified information, mutually-owned information (e.g., with a third party or government entity), or any other information, multimedia, or data. In many examples, although not required, tenant content may include information that is classified in some manner, according to some procedure, protocol, or jurisdiction-specific regulation. In many examples, tenant content can include logical objects defined by a particular multitenant platform. For example, a documentation service may define a page as an object; the page may be tenant content as used herein. In other examples, a paragraph of a page of a documentation service may be defined as a paragraph object, which may be tenant content distinct from its parent page.

In particular, the embodiments and architectures described herein can be leveraged by a provider of multitenant software and, in particular, by a provider of suites of multitenant software platforms, each platform being configured for a different particular purpose. Herein, providers of systems or suites of multitenant software platforms are referred to as "multiplatform software service providers."

As known to a person of skill in the art, customers/clients of a multiplatform service provider are typically tenants of multiple platforms provided by a given multiplatform service provider. For example, a single organization (i.e., a client of a multiplatform service provider) may be a tenant of an email platform and, separately, a tenant of a calendaring platform. The organization can create and/or purchase user accounts for its employees so that each employee has access to both email and calendaring functionality. In some cases, the organization may limit seats in each tenancy so that only certain users have access to email functionality and only certain users have access to calendaring functionality; the organization can exercise discretion as to which users have access to either or both tenancies.

In another example, a multiplatform service provider can host a suite of collaboration tools. For example, a multiplatform service provider may host, for its clients, a multitenant issue tracking system, a multitenant code repository service, and a multitenant documentation service. In this example, an organization that is a customer/client of the service provider may be a tenant of each of the issue tracking system, the code repository service, and the documentation service. As with preceding examples, the organization can create and/or purchase user accounts for its employees, so that certain selected employees have access to one or more of issue tracking functionality, documentation functionality, and code repository functionality.

In some conventional architectures, each multitenant suite ("platform") of a suite of multitenant services typically manages both authentication and authorization for each user account associated with each tenant thereof. In other words, conventional multitenant platforms are tasked with ensuring that: (1) an end-user attempting to access tenant content stored for the benefit of a particular tenant of a particular platform is, in fact, who that end-user identifies themselves to be (authentication); and (2) additionally, that an authenticated end-user is actually permitted to access the requested content and/or functionality of the particular tenancy (authorization).

As may be appreciated, managing user accounts and access permissions across multiple discrete platforms can be time consuming and cumbersome for both customers of multiplatform service providers and for multiplatform service providers alike.

In some conventional solutions, a single sign-on service can be used. As noted above, a single sign-on service can be configured to centralize management of authentication requests across a given organization's various tenancies. However, in conventional architectures, authorization requests for content access are still handled by each individual software service, in part at least because each individual software platform defines access permissions in a different, and platform-specific way.

For example, an issue tracking system may implement different permission policy than a documentation system. For example, even if both an issue tracking system and a documentation system implement role-based access controls, the "roles" available to be defined in each system varies. The issue tracking system may have roles such as admin, project manager, team member, developer, and so on whereas the documentation system may have roles such as admin, page owner, space owner, editor, reader, and so on.

As a result, conventional software platforms, (tenancies of which may be purchased, licensed, or otherwise used by an organization for the benefit of the organization's employees) require information technology ("IT") administrators to: regularly audit permissions policy compliance at each software platform, independently; onboard new employees by creating accounts and/or selecting permissions on a per-platform basis; change employee access manually on a per-platform basis; and so on. Generally and broadly, organization-wide management of permissions is an extremely arduous and substantially manual process.

Further to the foregoing problems, as an organization grows, it may purchase access to additional software platforms—linearly increasing the IT burden of maintaining permissions policy compliance across the organization.

Further still, as noted above, multiplatform service providers also face substantial challenges and issues related to authorization. For example, a multiplatform service provider may opt to provide one or more "integrations" between different platforms that allow content, features, and/or functionality of one platform to be used in a different platform.

Continuing an example introduced above, a multiplatform service provider may host an issue tracking system and a documentation system. This provider may also provide an integration that allows issue tracking information to be shown and/or displayed from within the documentation system. In this example, as may be clear to a person of skill in the art, the integration itself needs to be permissions policy compliant. More specifically, the integration must ensure that authenticated users of the documentation system that view a page that references information (and/or provides access to a feature) stored by the issue tracking system, are also authorized to view that information by the issue tracking system. In these and related examples, the integration may be configured to pass a given authenticated user's information (e.g., username, auth token, and so on) between the software platforms, making appropriate permissions requests of each platform. Only after permissions have been verified at all platforms can the content be rendered for the user.

Phrased in a more general way, a conventional architecture that includes one or more integrations between tenancies of different software platforms requires multiple permissions requests that may be forwarded to different systems, each of which may exhibit different latencies, and have different response formats, and so on. More broadly, conventional system architectures with integrations between software platforms necessarily require numerous network calls and requests, occupying bandwidth and computational resources at both software platforms and at the integration itself, to simply share and request information and service requests for information by and between the different software platforms.

Furthermore, the foregoing problem(s) with maintaining integrations' compliance with an organizations permissions policies and tenant content access policies may be exacerbated as a provider's platform suite grows. For example, a provider that maintains three separate platforms may choose to provide three separate integrations interconnecting all three platforms. In this example, the provider is also tasked with maintaining policy compliance for permissions associated with those three platforms and three integrations. If the provider on-boards yet another platform, a total of six integrations may be required. If the provider on-boards a fifth platform, a total of ten integrations may be required (e.g., 5 choose 2). A person of skill in the art can readily understand that the difficulties of maintaining integrations between different software platforms (in a permissions policy compliant manner) scales exponentially with the number of platforms provided.

As a result of these foregoing issues, among others, organizations and multiplatform service providers alike often delay the addition of, or entirely decline to add, new features or functionality. As a result, employees of an organization may not be afforded with all software tools necessary or desirable to optimize efficiency and collaboration. Similarly, multiplatform service providers may not be able to provide all features and/or services desired by their clients, which in turn can lead to loss of business or market advantages.

Embodiments described herein address these and other problems presented by conventional systems by providing a centralized access control and policy management service configured to manage permissions for each of a set of software services of a suite of software services provided by a multiplatform service provider.

A centralized access control service, as described herein, can be configured to serve as a façade and/or gateway that translates individual platform permissions application programming interface (API) calls into a uniform form and format, thereby enabling cross-platform permissions control. In other words, any permissions request generated or served within a multiplatform environment can be handled by the centralized access control service which, in turn, can either (1) service the request directly by accessing a permissions or rules database associated with the centralized access control service or (2) service the request by generating a platform-specific permissions API call. In this manner, permissions policy control can be elevated from a per-platform management task to an organization-level management task, dramatically simplifying permissions control.

For example, a centralized access control service as described herein may receive a request from an already-authenticated user to access content from a particular software platform. In a conventional architecture, such a request would be received directly by the software platform, which in turn would access an internal permissions database to determine whether the authenticated user is authorized to access that content. Upon determining that the user is authorized, the conventional system would service the request and provide the requested data and/or functionality. However, as my be known to a person of skill in the art, this conventional system relies entirely upon accuracy of the software platform's internal permissions database, which in some cases may not be up to date.

For embodiments described herein, however, the permissions request can be received at the centralized access control service. The centralized access control service can query one or more organization-wide permissions databases to determine whether the authenticated user is permitted to access the content. Thereafter, the centralized access control service can assert to the particular software platform that the requested data is authorized, after which the software platform can provide the requested data and/or functionality.

In another example, a centralized access control service can receive a permissions request that requests data from a multiple software platforms. In this example, the centralized access control service can query one or more organization-wide permissions databases to determine whether the authenticated user is permitted to access the requested content, regardless of where that content is stored (e.g. regardless of which software tool stores the requested content). Thereafter, the centralized access control service can assert to the particular software platform that the requested data is authorized, after which the software platform can provide the requested data and/or functionality.

In further examples, a centralized access control service as described herein can adopt a distributed architecture in which local copies of policies, rules, and/or other data are synchronized to instances of the centralized access control service. The local instances can be leveraged for redundancy and/or failover support purposes, for responsiveness purposes, or for any other suitable purposes. In some examples, permissions policy data associated with multiple tenants can be synchronized (and/or locally cached) to local instances via a suitable method. In response, local instances can implement policy control for more than one tenant and/or more than one platform of a multiplatform system. In these constructions, when a change is made to a policy of a particular tenant, a central hub of the centralized access control system can publish a command to each instance to either (1) update/pull new copies of all policy rules and/or just changed policy rules or (2) to delete all local copies of policy rules or changed policy rules, defaulting to rules provided by the hub until local caches can be rebuilt.

In the foregoing examples, each software platform may be required to receive assertions from the centralized access control service. More specifically, each of the software platforms may be configured to serve data to the centralized access control service, bypassing any internal permissions systems or verifications. In other words, the foregoing described embodiments may presume that software platforms are configured to defer all permissions control and decision-making to the centralized access control service.

However, in many cases, a multiplatform service provider may operate one or more legacy systems that is not configured to ignore or otherwise bypass internal permissions or controls. In such examples, a centralized access control service as described herein can be configured to access a legacy system as an admin and/or super-admin user. As a result of this configuration and construction, the centralized access control service can access all content and features of the legacy system, and in turn can grant or deny access to particular content or features based on its own internal permissions compliance rules and databases. In other cases, the centralized access control service can be configured to wrap a permissions API of the legacy system so that requests from other systems with different permissions schemes can submit permissions requests of the legacy system to the centralized access control service.

In some cases, the centralized access control service can be implemented as a distributed permissions service in which parts or all functionality of the centralized access control service are duplicated in redundant fashion by different instances of the service instantiated in different geographic locations. In these examples, local copies of permissions rules and/or policies can be synchronized to a hub of the centralized access control service. The local instances of the centralized access control service can be ephemeral or durable; configurations and constructions may vary from embodiment to embodiment.

More generally and broadly, a centralized access control service as described herein can be referred to as a "gateway service" that serves as an intermediary between content requesters (e.g., edge devices; end user devices) and content providers, such as individual software platforms of a suite of software platforms hosted by a multiplatform service provider.

As a result of the systems described herein, organizations can exercise precise control of content permissions, across multiple different platforms, from a single location—namely, the centralized access control service.

For example, an administrator of the centralized access control service can implement organization-level role based permissions, instead of platform-level roll based permissions. In this administrator can define that all managers in an organization have the same access across all tools. In other cases, permissions can be based on a team-by-team basis. In such examples, team-based permissions can dramatically simplify onboarding of new employees or team members; a single addition in the centralized access control service can permit a new team member to access specific content relevant to the team's project(s) stored in a documentation service, stored in an issue tracking service, and/or stored in any other suitable collaboration tool.

In yet other cases, permissions can be based on runtime attributes, such as a time period that a particular authenticated user last re-authenticated (e.g., via two-factor authentication). In yet other examples, permissions can be time-limited. For example, a consultant or intern may join a particular team for a temporary period. By adding the consultant to a permissions group (e.g., the team) for a fixed or variable duration of time, the consultant can be granted access to all tools used by that team for an appropriate amount of time. This in contrast to conventional systems in which an IT professional is required to manually (or with scripts) create multiple user accounts for the consultant and revoke access to those accounts at a later time.

In yet other examples, permissions can be based on objects or entities defined by a particular collaboration tool or software platform. For example, the centralized access control service may use a project list stored and/or defined by a project management system to define permissions for an issue tracking system and/or a documentation system. In other words, any user or account that has access to a particular project in the project management system automatically has access to related information in the documentation system and the issue tracking system without requiring specific user accounts to be created therein. In some cases, permissions can be based on and/or may be informed by associations between different roles as defined by different systems. For example, a manager role in a first system may be permitted to access content otherwise accessible to a controller role in a second system and vice versa. In other cases, logical associations between different roles defined by or associated with different systems may inform permissions decisions. For example, a member of a particular team defined in a first system may be permitted to access, but not edit, content of an associated team defined in a second system. These foregoing examples are not exhaustive; it may be appreciated that generally and broadly, a system as described herein can be configured to link role-based permissions between different tools, form many-to-one relationships between roles of different tools, form one-to-many relationships between roles of different tools, or manage role-based permissions in any suitable manner.

A system as described herein can have the further advantage of eliminating the need for integrations to monitor for permissions compliance. In some instances, integrations may not be required at all, as the centralized access control service coordinates access to appropriate content from any software platform. As a result of this benefit, multiplatform service providers can readily onboard new features and software platforms without undertaking the expensive burdens of reconfiguring existing tools, developing new integrations, and/or ensuring that policies are correctly respected throughout an organization.

Further still, a person of skill in the art may readily appreciate that by centralizing permissions control, developers of software tools that leverage a centralized access control service as described herein are entirely alleviated of the burdens of implementing policy protections within their respective software tools. As a result, development teams can spend a greater amount of time improving existing software tools without absorbing the overhead associated with policy compliance.

These foregoing and other embodiments are discussed below with reference to FIGS. 1-4 However, those skilled in the art will readily appreciate that the detailed description given herein with respect to these figures is for explanation only and should not be construed as limiting.

FIG. 1 depicts a simplified system diagram of a collaborative work environment 100 leveraging a centralized access control service, such as described herein. For simplicity of illustration, the embodiments that follow reference an example construction in which an organization is a tenant of multiple discrete multitenant services that can be leveraged by employees of the organization to advance a common goal.

It may be appreciated that multitenant services are (e.g., platform as a service, software as a service, data as a service, and so on) are merely one example of software configurations that can leverage methods and systems described herein. In particular, it may be appreciated that licensed software, single-tenant software, and/or self-hosted software tools can likewise implement systems and methods, and leverage benefits therefrom, such as described herein.

Accordingly, because a person of skill in the art will readily appreciate how permissions management techniques described herein can be equivalently applied to many software systems and data architectures, examples that follow reference only multitenant system architectures (e.g., systems leveraging one or more multitenant services for collaboration purposes) for simplicity of description.

Example services that can be architected as multitenant services in which different tenants' content is isolated from one another may include, without limitation messaging services; telecommunication services; videoconferencing services; issue tracking services; repository services; documentation services; document management systems; knowledge sharing systems; project management services; enterprise resource planning services; supply chain management services; and so on. Any content added to any of these services, including input(s) provided to customize a particular instance (or tenant experience) of a particular multitenant service, including multimedia data such as images, audio files, or videos, can be considered user-generated, content as described herein.

In the illustrated example, the collaborative work environment 100—which is merely one example of an architecture such as described herein—includes a host server 102 that communicably couples via one or more networking or wired or wireless communication protocols to a client device 104. It may be appreciated that other client devices may be configured in a substantially similar manner as the client device 104, although this may not be required of all embodiments and different client devices can be configured differently and/or may transact data or information with, and/or provide input(s) to, the host server 102 in a unique or device-specific manner.

The client device 104 can be any suitable personal or commercial electronic device and may include, without limitation or express requirement, a processor 104a, volatile or non-volatile memory (identified, collectively, as the memory 104b), and a display 104c. Example electronic devices include, but are not limited to: laptop computers; desktop computers; cellular phones; tablet computing devices; and so on. It may be appreciated that a client device 104, such as described herein, can be implemented in any suitable manner.

In many embodiments, the processor 104a of the client device 104 can be configured to execute one or more software applications (each referred to as "client applications") stored, at least in part, in the memory 104b. Each respective client application can be instantiated by the processor 104a. In particular, the processor 104a may access a persistent memory (e.g., of the memory 104b) to retrieve one or more executable binary files and/or other computer-executable instructions (collectively, "assets"). The processor 104a thereafter can load at least a portion of the retrieved assets into a working memory (e.g., of the memory 104b), thereby at least partially instantiating the respective client application. For simplicity of description an implementation in which the client device 104 is configured to execute/instantiate a single client application is described below.

In embodiments, the host server 102 is configured to operate within or as a virtual computing environment that is supported by one or more physical servers including one or more hardware resources such as, but not limited to (or requiring) one or more of: a processor; a memory (also referred to as a working memory); non-volatile storage (also referred to as persistent memory); networking connections; and the like.

Specifically, it may be appreciated that although referred to as a singular "server", the host server 102 may be a cluster of different computing resources, which may be geographically separated from one another. In this manner, generally and broadly, both the host server 102 and the client device 104 can be referred to, simply, as "computing resources" that are communicably coupled to one another via a suitable network connection.

As used herein, the term "computing resource" (along with other similar terms and phrases, including, but not limited to, "computing device" and "computing network") may be used to refer to any physical and/or virtual electronic device or machine component, or set or group of interconnected and/or communicably coupled physical and/or virtual electronic devices or machine components, suitable to execute or cause to be executed one or more arithmetic or logical operations on digital data.

Example computing resources contemplated herein include, but are not limited to: single or multi-core processors; single or multi-thread processors; purpose-configured co-processors (e.g., graphics processing units, motion processing units, sensor processing units, and the like); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices systems and components thereof (e.g., navigation devices, safety devices or controllers, security devices, and the like); corporate or business infrastructure devices or appliances (e.g., private branch exchange devices, voice-over internet protocol hosts and controllers, end-user terminals, and the like); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices and so on); and so on. It may be appreciated that the foregoing examples are not exhaustive.

As noted above, the host server 102 and the client application supported/executed by the client device 104 are communicably coupled via a suitable network connection which may be wired, wireless, or a combination thereof. In some examples, the network connection may include the open Internet.

In other cases, the network connection coupling the host server 102 and the client application may include only a private intranet managed by, or otherwise utilized by, an organization such as referenced above. The host server 102 and the client application can communicate according to any suitable protocol, form, or format. In many examples, the host server 102 at least partially exposes an API that can be accessed by the client application to perform one or more functions. For example, the client application may leverage the API to request tenant content (such as described herein) from the host server 102.

For simplicity of description, the embodiments that follow reference a configuration in which the host server 102 and the client application are configured to communicate and transact information according to a REST API, but it may be appreciated that this is merely one example and in other embodiments other signaling, communication, or data transaction methodologies may be used.

The host server 102 of the collaborative work environment 100 can be configured and/or implemented in a number of suitable ways. For example, in many embodiments the host server 102 can leverage physical and/or virtual resources allocated to it to instantiate any suitable number of discrete subservices or purpose-configured modules, containers, virtual or physical networks, or virtual machines each configured to perform, coordinate, host, serve, or otherwise provide one or more services, functions, or operations of the host server 102, such as a gateway service 106.

The gateway service 106 can be hosted by a virtual machine or container executing over physical or virtual resources of the host server 102; collectively the physical and/or virtual resources allocated to instantiate the gateway service 106 are identified in the figure as the resource allocation(s) 106a. As with other embodiments described herein, the resource allocation(s) 106a can include, but may not be limited to (or may not require) one or more of: a processor; a memory; non-volatile storage; networking connections; and the like.

For example, in many constructions, the gateway service 106 is implemented in whole or in part as a software instance. The software instance defining the gateway service 106 may be instantiated by a processor among the resource allocation(s) 106a. In particular, the processor may access a persistent memory to retrieve one or more executable assets. The processor thereafter can load at least a portion of the retrieved assets into a working memory, thereby at least partially instantiating the gateway service 106.

In some embodiments, the gateway service 106 may be provided as a serverless function (e.g., a lambda function), may be provided as a reverse proxy, may be provided as a router or as any suitable software and/or hardware appliance configurable to communicably couple at least to the client device 104 and to service requests for information therefrom, such as requests for tenant content, such as described herein.

In other implementations, although not illustrated, the gateway service 106 may be executed/instantiated separately from the host server 102 altogether.

As noted with respect to other embodiments described herein, the gateway service 106 can be configured to receive requests and serve responses specifically related to tenant content created within an environment defined at least in part by a multitenant software service. Such requests for tenant content may include requests for permissions validation and/or may automatically trigger one or more permissions compliance operations. In some cases, the gateway service 106 may also be configured for authentication operations, but for simplicity of description the embodiments that follow reference only permissions based decision-making.

An example multitenant service is a project management service. In this example, tenant content may be a task list attributed to, or otherwise associated with, a particular user of the project management service. At some instant, the user—having been previously authenticated by a service such as a single sign-on service or other credential verification service—may operate the client device 104 to initiate a request intended to be received by the project management service to retrieve the task list.

After the authenticated user of the client device 104 is determined to be authorized to view the task list, a copy of the task list can be transmitted via a suitable channel in a suitable format, via the gateway service 106 to the client device 104 for rendering in a graphical user interface defined by the client application and displayed on the display 104c. More particularly, in this example, the gateway service 106 interposes the project management service and the client application, routing authorized and policy-compliant requests for tenant content (e.g., the task list) originating from the client application, to the project management service.

As understood by a person of skill in the art, as a part of servicing this request from the client device 104, the gateway service 106 can determine whether the already-authenticated user currently using the client device has permission to access the requested tenant content, in this case, the task list.

More specifically, the gateway service 106 can be configured to communicably couple to a centralized access control service 108, which maintains one or more internal databases and/or maintains access to one or more external databases storing one or more policy documents and/or policy-as-code codebases.

The policy documents/code may be at least partially executable and/or readable by the centralized access control service 108 which, in turn, can receive as input some identifier (herein a "user identifier") associated with the authenticated user, such as a user identifier, a user account identifier, and/or session identifier associated with the client device and so on. In addition, the centralized access control service 108 can receive as input some identifier (herein, a "content identifier") associated with and/or identified the content being requested by the authenticated user, in this case, the task list. In other cases, a "feature identifier" may take the place of a "content identifier" herein, referring instead of content, to a feature or functionality of a software platform. As one example, a feature identifier may reference an ability of a messaging platform to send and/or receive a message.

The content identifier and the user identifier can be used to generate a query of one or more of the policy documents/code objects instantiated by the centralized access control service 108, which in turn can be configured to generate a Boolean (or other) output indicating whether the authenticated user is permitted, according to one or more policy documents/code, to access the requested content. This response, referred to herein as an "authorization response," can be transmitted by the centralized access control service 108 back to the gateway service 106 as the authorization response 110.

In some cases, as noted above, the centralized access control service 108 can be implemented as a distributed system, in which one or more partial or complete instances of at least a portion of the centralized access control service 108 are instantiated in particular geographic locations and/or according to some desired parameter. In FIG. 1, optional distributed policy decision points are identified as the distributed policy decision points 112. Upon determining that the authenticated user is permitted to access the task list, the gateway service 106 can return to the client device 104 the task list formatted in a format requested by and/or expected by the client device 104. It may be appreciated that this is merely one example construction, and that in other examples multiple policy decision points may be separately and/or differently configured to service different policy requests and/or authorization requests related to specific products, specific tenants, specific geographies, and so on.

In another example, a multitenant service may be a project management service. In this example, tenant content may be a set of documentation detailing one or more projects attributed to or otherwise associated with a particular user of the project management service.

At some instant, the user may operate a graphical user interface rendered on the display 104c by the client application to initiate a request intended to be received by the project management service to retrieve the set of documentation detailing a selected project; each document of the set may be a separate tenant content item. In some examples, each paragraph of each document may be separate tenant content objects/items. As with other examples described herein, it may be appreciated that any suitable In this example, as with others described herein, the gateway service 106 interposes the project management service and the client application, routing the request for tenant content originating from the client application to the project management service.

As with the preceding example, as a part of servicing this request, the gateway service 106 can determine whether an authenticated user currently using the client device has permission to access the requested tenant content. Upon determining that the authenticated user is permitted to access the requested tenant content (by communicating with the centralized access control service 108 and receiving an authorization response 110), the gateway service 106 can return to the client device 104 the requested information, formatted in a format requested by and/or expected by the client device 104.

In further examples, as described above, a single collaborative work environment, such as the collaborative work environment 100, may leverage a number of discrete services which may or may not be supplied by the same vendor.

For example, an organization may be a tenant of a messaging service, a project management service, an issue tracking service, a directory service, an email service, a telephony service, and a code repository service—each of which may define an environment in which a user of that service can create and consume tenant content specific to each individual service or tool.

In these examples, the client application may be operated at some instant by a user to obtain a message from the messaging service, obtain information about a project form the project management service, add an issue to the issue tracking service, obtain contact details for a colleague leveraging the directory service, send an email to that colleague via the email service, receive a voice message from that colleague via the telephony service, and submit a pull request to the code repository service.

In these examples, as may be appreciated, the gateway service 106 can be configured to route each respective request from the client application to each appropriate intended recipient/endpoint service after permissions for the request have been verified by the centralized access control service 108 issuing an authorization response 110. In particular, authorized tenant content requests related to messaging are routed to the messaging service, authorized tenant content requests related to email are routed to the email service, authorized tenant content requests related to telephony are directed to the telephony service, and so on. In these examples, if a particular request is not authorized, the intended targeted software platform may not be invoked at all; the request may simply be blocked by the gateway service 106, thereby saving bandwidth and resource utilization of the intended targeted software platform for servicing authorized requests only.

In view of the foregoing examples, each of which may be associated with—and/or dependent upon—one or more permissions verification operations, it may be appreciated that, generally and broadly, the client application executed/instantiated by the client device 104 may be purpose configured to communicate with a particular multitenant service. More specifically, the client application may be configured to communicate with the multitenant service according to a particular API defined by that multitenant service by submitting an API request and/or response, identified in FIG. 1 as the API request 114. In the illustrated example, two example multitenant services are illustrated with which the client application(s) instantiated by the client device 104 may communicate.

A first multitenant service is identified as the multitenant service 116 and a second multitenant service is identified as the multitenant service 118.

As with other computing resources described herein, the multitenant service 116 and the multitenant service 118 can be hosted by a virtual machine or container executing over physical or virtual resources; collectively the physical and/or virtual resources allocated to instantiate the multitenant service 116 and the multitenant service 118 are identified in the figure as the resource allocation(s) 116a, 118a, respectively. The resource allocation(s) 116a, 118a can include, but may not be limited to (or may not require) one or more of: a processor; a memory; non-volatile storage; networking connections; and the like For example, in many constructions, each of the multitenant service 116 and the multitenant service 118 is implemented in whole or in part as a software instance of which the organization is a tenant. Each respective software instance defining each of the multitenant service 116 and the multitenant service 118 may be instantiated by a processor allocation. In particular, the processor allocation may access a persistent memory to retrieve one or more assets. The processor thereafter can load at least a portion of the retrieved assets into a working memory, thereby at least partially instantiating the multitenant service 116 and the multitenant service 118.

In these examples, the gateway service 106 of the host server 102 can be configured to route requests (herein "API requests") from one or more client applications executing on the client device 104 (conforming to endpoint-specific APIs) to either of the multitenant service 116 and the multitenant service 118. In some cases, the gateway service 106 is configured as a pass-through, whereas in others, the gateway service 106 may be configured to modify requests submitted from client applications and intended to be received by multitenant applications. The gateway service 106 can identify and/or predict an appropriate endpoint using any suitable method including, but not limited to: request format; request content; request header tags; domains, subdomains, or URLs to which the request is directed; and so on. It may be appreciated that these foregoing examples are not exhaustive of the ways by which the gateway service 106 may route signals and/or may make determinations in advance of, or otherwise to inform, routing signals to various multitenant services.

In the illustrated embodiment, the API request 114 is routed by the gateway service 106 to one of the multitenant service 116, 110 after having determined that the request is authorized by communicating, as described above, with the centralized access control service 108.

These foregoing embodiments depicted in FIG. 1 and the various alternatives thereof and variations thereto are presented, generally, for purposes of explanation, and to facilitate an understanding of various configurations and constructions of a centralized access control service (including a gateway), such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 2:
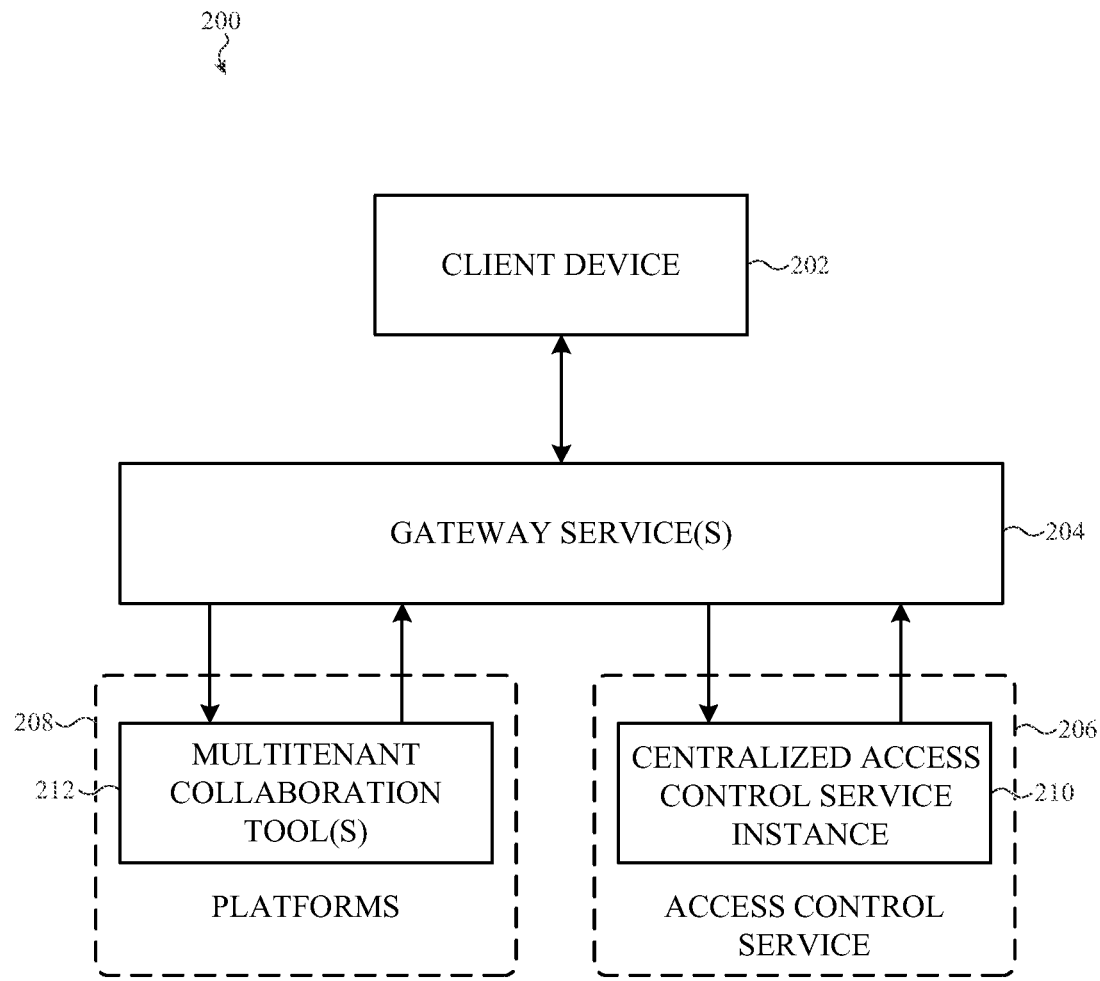
FIG. 2 depicts a simplified system diagram of a local instance of a centralized access control system or service, such as described herein.

FIG. 2 depicts a simplified system diagram of a centralized access control service managed by an access control system, such as described herein. The system 200 services requests from a client device that may be configured to execute one or more instances of one or more client applications, such as described above. The client device may be configured as described above with reference to the client device 104 of FIG. 1; this description is not repeated.

A client application instance (more simply, the "client application") executing on the client device 202 may be a native application, a browser application pointing to a particular address, or may any other suitable application or application or function wrapper. In the illustrated embodiment, the client application is identified as the client application 202. Regardless of the specific implementation of the client application 202, it is configured to communicably couple to a multitenant service. As one example, the client application 202 may be a local code repository management application and the multitenant service may be a code repository service.

As with other embodiments described herein, the client application 202 is communicably coupled to a gateway 204. The gateway 204 is in turn communicably coupled to an access control service 206 and one or more multitenant collaboration tools 208.

As with other embodiments described herein, the access control service 206 can be implemented as a single server or service or, in other cases, may be implemented as a distributed platform (having any suitable architecture and/or synchronization technique) in which two or more instances of a centralized access control service are instantiated. Each of these instances can include and/or may be implemented as a permission cache or as a redundant copy of the access control service.

In some cases, different instances can be instantiated in different geographic locations. In other cases, different instances can be instantiated in the same geographic location, and one may serve an overload protection and/or a load balancing purpose with respect to the other. For simplicity of description, a single instance is shown and labeled as the centralized access control service instance 210.

Similarly, the one or more multitenant collaboration tools 208 can be implemented as or on a single server or service or, in other cases, may be implemented as a distributed platform (having any suitable architecture and/or synchronization technique) in which two or more instances of a different platforms and/or services associated with those platforms are instantiated. In some cases, different instances can be instantiated in different geographic locations. In other cases, different instances can be instantiated in the same geographic location, and one may serve an overload protection and/or a load balancing purpose with respect to the other. For simplicity of description, a single instance is shown and labeled as the multitenant collaboration tool 212.

As a result of the depicted architecture, any content request initiated by the client device 202 is routed, initially, through the gateway service 204 to an available instance of the centralized access control service, such as the centralized access control service instance 210. The centralized access control service instance 210 receives the content request from the gateway service 204 and based on, in one example, a content identifier and a user identifier, determines whether the identified user is permitted to access the identified content. In some cases, the centralized access control service instance 210 may be configured to load into memory one or more policies. The policies can take any suitable form or format and may, as noted above, vary from embodiment to embodiment and implementation to implementation.

More generally, the policies can define a behavior of the centralized access control service instance 210 (e.g., policy as code) such that in response to receiving the content identifier and/or the user identifier, the centralized access control service instance 210 is configured to provide an output such as a Boolean output (which may be encrypted and/or securely communicated back to the gateway service 206, the client device 202, or directly to the multitenant collaboration tool 212) that indicates whether the identified user is permitted to access the identified content.

Upon receiving output from the centralized access control service 210, the gateway service 204 can in some examples pass a token or other cryptographic data item included with the output from the centralized access control service 210 back to the client device 202. In other cases, the gateway service 206 can be configured to communicate the output from the centralized access control service 210 to the multitenant collaboration tool 212 which, in response, can communicate the requested/identified content to the gateway service 204 which, in turn, can forward the content to the client application executing on the client device 202.

These foregoing embodiments depicted in FIGS. 1-2 and the various alternatives thereof and variations thereto are presented, generally, for purposes of explanation, and to facilitate an understanding of various configurations and constructions of a centralized access control service (including a gateway), such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 3:
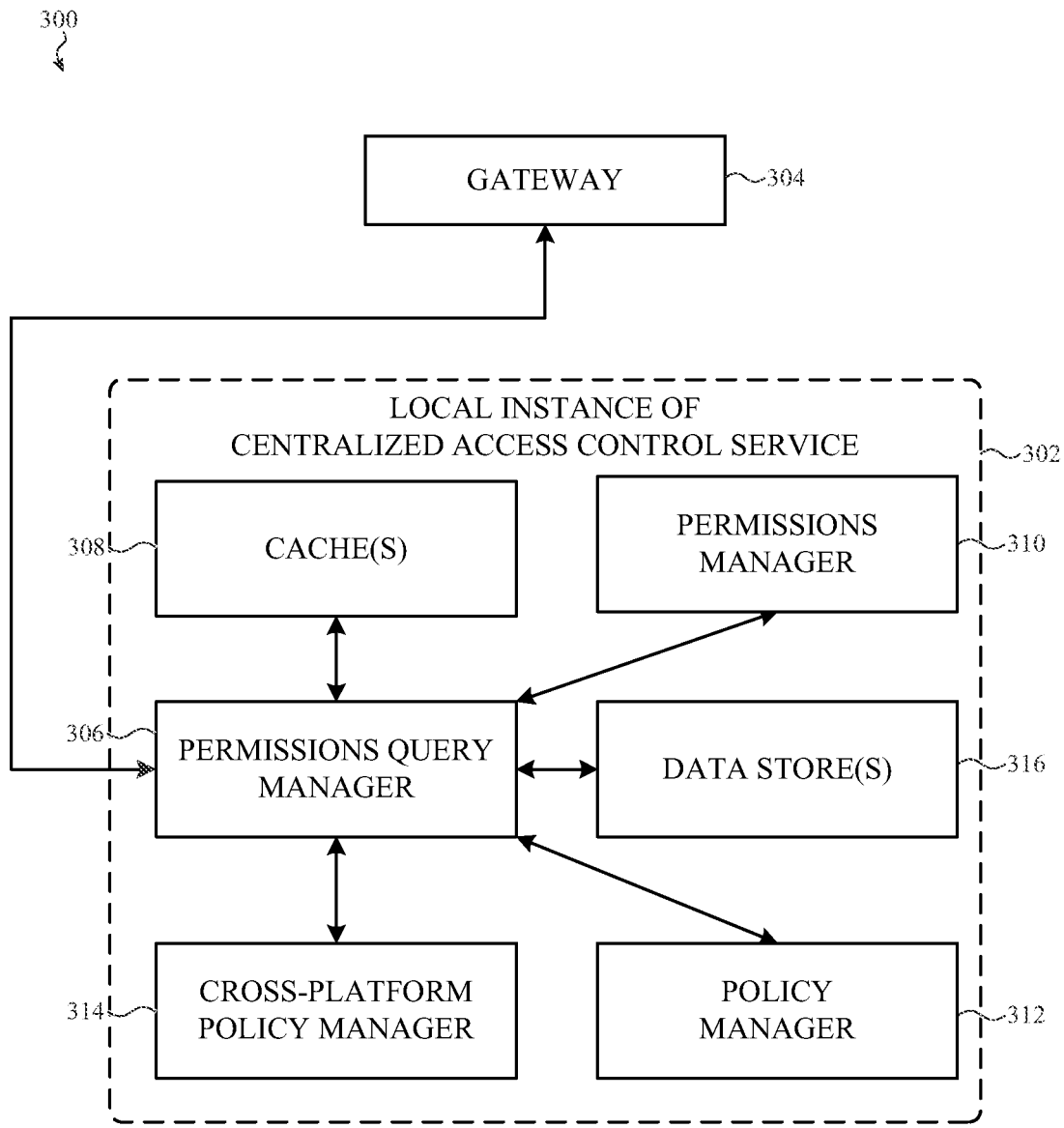
FIG. 3 depicts another simplified system diagram of a local instance of a centralized access control system or service, such as described herein.

For example, FIG. 3 depicts a simplified diagram of an instance of a centralized access control service 300. In particular, as with other embodiments described herein, the centralized access control service 300 can be instantiated in whole or in part any suitable number of times, in any suitable geographic or logical locations. As illustrated, the instance 302 is understood to be a single instance, but it is also appreciated that this is merely one example and the depicted construction/architecture is not exhaustive.

As with other embodiments described herein, the instance 302 is communicably coupled to a gateway 304. The instance 302 can be configured to receive from the gateway 304 one or more permissions requests which can include, in many cases, a content identifier and a user identifier. As noted above, a permissions request can include any suitable identifiers and may not be limited to content identifiers and/or user identifiers. For example, in some embodiments, the permissions request can include: a role identifier; an organization identifier; a tool or platform identifier; a timestamp; a datestamp or timestamp at which a two factor authentication operation failed or succeeded; a priority indicator; and so on.

The instance 302 can receive permissions requests from a permissions query manager 306. The permissions query manager 306 may be configured to parse the permissions request and determine how to determine which permissions are invoked by the request. For example, in some cases, a content identifier may indicate that the requested content is open content that is permitted to be accessed by any person, authenticated or not, the requests the content. In this example, the permissions query manager 306 may not need to process any further information from the permissions request and may, instead, return an authorization response that indicates that the requested content can be accessed by the person or user account that initiated the request. In other cases, as may be appreciated by a person of skill in the art, a user identifier and a content identifier should be analyzed together to determine, by the instance 302, whether to authorize access to the requested content.

In some examples, the permissions query manager 306 can first access a cache 308 to determine whether an identical request or substantially similar request has been recently received (e.g., received within a particular timeout period), and, whether a previously-determined authorization result stored in the cache 308 can be returned. In some cases, certain permissions rules, objects, or decisions can be pre-cached and/or pre-fetched from a central hub for improved performance. In some examples, as noted above, the cache 308 can store permissions rules, policy objects or code, or permissions decisions for a number of tenants, for a number of software platforms, or a combination thereof. In some cases, the cache 308 can be cleared on a schedule, individual items stored by the cache can be cleared on a schedule, and/or another cache freshness maintenance method may be implemented. In other cases, the permissions query manager 306 and/or another element may signal the cache 308 to clear, to clear a particular item stored therein, or to pre-fetch a cacheable item from a central hub, from a data store, or another appropriate location. For example, if a permissions rule changes at a central hub, a message from that hub may cause the cache (or an item stored therein) to clear so that the cache does not inadvertently approve of a tenant content request that would be denied in view of the updated permissions rule.

In other cases, (and/or if the cache 308 is not usable to service the permissions request) the permissions query manager 306 may be configured to access one or more permissions managers to determine whether the permissions request should be granted. For example, in some configurations, a general permissions manager 310 can be configured to load one or more policies from a policy manger 312 into memory. The policies may associated particular roles with particular content, particular users with particular permissions or rules, and so on. A person of skill in the art understands and appreciates that any suitable number of policies and/or business rules can be constructed and implemented by a permissions manager, such as the permissions manager 310.

In other cases, a permissions request may invoke multiple platforms. In such examples, the permissions query manager 306 may leverage a cross-platform policy manger 314 that stores and access policies related to how content can be shared between different platforms of a multiplatform suite.

In yet other examples, a permissions request may invoke a policy that requires access to a database and/or input in order to validate. For example, a policy may define that particular content can only be accessed a set number of times. In this example, the cross-platform policy manager 314 and/or the permissions manager 310 and/or the permissions query manager 306 may be configured to access a data store 316 to determine whether the policy is violated and the permissions request should be denied.

The foregoing embodiments depicted in FIG. 3 and the various alternatives thereof and variations thereto are presented, generally, for purposes of explanation, and to facilitate an understanding of various configurations and constructions of a centralized access control service and various modules and/or subservices thereof, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, it may be appreciated that generally and broadly the embodiments described herein reference a system architecture in which permissioning decisions are removed from individual software services or platforms and are handled by a dedicated, centralized (and/or distributed) service. This service, referred to herein as a centralized access control service is configured to answer permissions questions relating users, roles, logical objects, platforms, and the like to particular content owned by a tenant of a multitenant platform.

Figure 4:
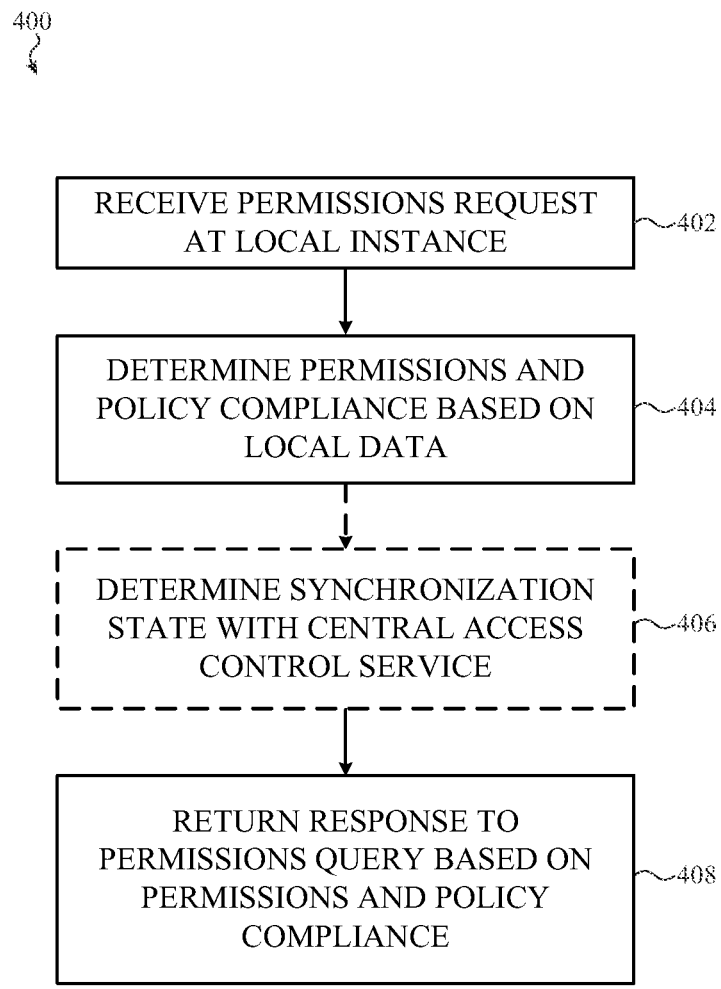
FIG. 4 is a flowchart depicting example operations of a method of serving tenant content, such as described herein.

FIG. 4 is a flowchart depicting example operations of a method of serving tenant content, such as described herein. As may be appreciated by a person of skill in the art, the method referenced by FIG. 4 can be performed by any suitable hardware or software, or combination thereof.

The method 400 includes operation 402 at which a permissions request is received at a local instance of a centralized access control service. Next at operation 404, the centralized access control service can determine whether one or more data access policies are invoked by the permissions request and, additionally, whether the request complies with those policies.

Optionally, at operation 406, the centralized access control service can submit a synchronization request to another instance and/or a central server associated with the centralized access control service to ensure that the local instance of the centralized access control service is current (e.g., has copies of all current rules and policies of the organization). If a change in policy is detected, the method 400 can revert to operation 404. In other architectures, the centralized access control service can progressively cache rules and/or permissions request results such that, over time, a local permissions ruleset is automatically built to service the most common requests. In other cases, synchronization can occur on a per-entity basis, a per-tenant basis, per-rule basis, or per-policy basis at any other time—in some examples a single rule change at a central hub can be pushed to all local instances, a single rule change can trigger a clear-cache operation, and so on. A person of skill in the art appreciates that many configurations and techniques are possible.

Finally, at operation 408, depending upon the result of at least operation 404, the centralized access control service can return an authorization response to the initiator of the permissions request. The authorization response, as described above, contains and/or otherwise securely conveys an answer whether the requested content request should be fulfilled by an associated multitenant software platform.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

Further, many foregoing examples and description of instances of purpose-configured software, whether accessible via API as a request-response service, an event-driven service, or whether configured as a self-contained data processing service are understood as not exhaustive. In other words, a person of skill in the art may appreciate that the various functions and operations of a system such as described herein can be implemented in a number of suitable ways, developed leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, and so on or any combination thereof), and so on. The various functions described herein can be implemented in the same manner (as one example, leveraging a common language and/or design), or in different ways. In many embodiments, functions of a system described herein are implemented as discrete microservices, which may be containerized or executed/instantiated leveraging a discrete virtual machine, that are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference an implementation in which discrete functions of the system are implemented as discrete microservices. It is appreciated that this is merely one possible implementation.

In addition, it is understood that organizations and/or entities responsible for the access, aggregation, validation, analysis, disclosure, transfer, storage, or other use of private data such as described herein will preferably comply with published and industry-established privacy, data, and network security policies and practices. For example, it is understood that data and/or information obtained from remote or local data sources, only on informed consent of the subject of that data and/or information, should be accessed aggregated only for legitimate, agreed-upon, and reasonable uses.

What is claimed is:

1. A permissions management system for a multiplatform service, the permissions management system comprising:
   a host server comprising a processor executing an instance of a centralized access control system coupled to a centralized access control service, the instance of the centralized access control system configured to:
   receive, from a gateway service communicably coupled to a client device, a permissions request triggered by an input received at the client device;
   determine, from the permissions request:
      a content identifier associated with a tenancy of a software platform of the multiplatform service; and
      a user identifier associated with an authenticated user of at least one platform of the multiplatform service;
   generate a permissions query based on the content identifier and the user identifier;
   submit the permissions query to a permissions manager module of the instance of the centralized access control system, the permissions manager module operating according to a cached copy of at least one policy received from the centralized access control service, the cached copy comprising permissions data received from the centralized access control service;
   receive from the permissions manager module an authorization response;
   return the authorization response to the gateway service to cause the software platform to return to the client device at least one content item stored by the software platform identified by the content identifier.

2. The permissions management system of claim 1, wherein:
   the software platform is a first software platform; and
   the user identifier is associated with an authenticated user of a second software platform of the multiplatform service.

3. The permissions management system of claim 1, wherein the instance of the centralized access control system is configured to return the authorization response to the gateway service only in response to the permissions manager module determining that a user associated with the user identifier is permitted to access the at least one content item.

4. The permissions management system of claim 3, wherein the permissions manager module is configured to access one or more policies to determine whether the user is permitted to access the at least one content item.

5. The permissions management system of claim 4, wherein the one or more policies are stored in a policy codebase in communication with the permissions manager module.

6. The permissions management system of claim 1, wherein the instance of the centralized access control system is configured to return the authorization response to the gateway service only in response to a cross-platform permissions manager module determining that a user associated with the user identifier is permitted to access the at least one content item.

7. The permissions management system of claim 1, wherein the authorization response comprises a Boolean value indicating that a user associated with the user identifier is permitted to access content associated with the content identifier.

8. The permissions management system of claim 1, wherein the software platform is a collaboration service.

9. The permissions management system of claim 8, wherein the collaboration service is selected from:
   an issue tracking system;
   a documentation system;
   a project management system; or
   a code repository system.

10. A method of managing permissions in a multiplatform system, the method comprising:
    receiving, at a gateway service from a client application executing on a client device, a request to access requested content identified by a content identifier by a user identified by a user identifier;
    determining, by the gateway service, that the content identifier references content stored in a first platform of the multiplatform system;
    forwarding, by the gateway service to an instance of a centralized access control system, at least the content identifier and the user identifier, the instance of the centralized access control system having a permissions manager operating according to a cached copy of at least one policy comprising permissions data received from the centralized access control system;
    receiving, at the gateway service, an authorization response from the instance of the centralized access control system;
    forwarding, by the gateway service, the authorization response to the first platform of the multiplatform system;
    receiving, at the gateway service from the first platform, the requested content referenced by the content identifier; and
    forwarding, by the gateway service to the client application, the requested content.

11. The method of claim 10, wherein the user is not an authenticated user of the first platform.

12. The method of claim 10, wherein the user is an authenticated user of a second platform of the multiplatform system.

13. The method of claim 10, wherein the authorization response is generated, at least in part, on output from a cross-platform policy manager of the instance of the centralized access control system.

14. The method of claim 13, wherein the authorization response is generated, at least in part, on output from the permissions manager of the instance of the centralized access control system.

15. A method of managing permissions in a multiplatform system, the method comprising:
    receiving, at a gateway service from a client application executing on a client device, a request to access, by a user identified by a user identifier, a feature of an identified platform of the multiplatform system identified by a feature identifier;
    forwarding, by the gateway service to an instance of a centralized access control system, at least the feature identifier and the user identifier, the instance of a centralized access control system having a permissions manager operating according to a cached copy of at least one policy comprising permissions data received from the centralized access control system;
    receiving, at the gateway service, an authorization response from the centralized access control system;
    determining whether the authorization response permits the user to access the feature, and in response:
       forwarding, by the gateway service, the authorization response to the identified platform of the multiplatform system;

receiving, at the gateway service from the identified platform, a response from the identified platform relating to the feature identified by the feature identifier; and forwarding, by the gateway service to the client application, the response from the identified platform.

16. The method of claim 15, wherein the identified platform is one of:

an issue tracking system;
a project management system; or
a documentation system.

17. The method of claim 15, wherein the multiplatform system comprises three or more software as a service platforms.

18. The method of claim 15, wherein the instance of the centralized access control system is a local instance.

19. The method of claim 15, wherein the user is an authenticated user of a platform different from the identified platform.

20. The method of claim 15, wherein in response to determining that the authorization response does not permit the user to access the feature, denying access to the feature.

* * * * *